United States Patent

[11] 3,618,985

| [72] | Inventor | Elmer M. Farr |
| | | P.O. Box 265, Saratoga, Tex. 77585 |
| [21] | Appl. No. | 844,824 |
| [22] | Filed | July 25, 1969 |
| [45] | Patented | Nov. 9, 1971 |

[54] TRAILER HITCH
8 Claims, 6 Drawing Figs.

| [52] | U.S. Cl. | 280/512 |
| [51] | Int. Cl. | B60d 1/06 |
| [50] | Field of Search | 280/492, 511, 512, 513, 505, 504, 507, 508, 509, 510, 515; 287/DIG. 8 |

[56] References Cited

UNITED STATES PATENTS

| 1,978,859 | 10/1934 | Draeger | 280/511 |
| 2,824,754 | 2/1958 | Bolmes et al. | 280/512 |
| 3,009,714 | 11/1961 | Lamberson | 280/512 |
| 3,158,387 | 11/1964 | Martin | 280/478 |

FOREIGN PATENTS

| 790,757 | 11/1935 | France | 280/512 |

*Primary Examiner* — Leo Friaglia
*Assistant Examiner* — John P. Silverstrim
*Attorney* — Berman, Davidson and Berman ABSTRACT: A trailer hitch comprising a body member of elongated configuration having a socket formed in the front end thereof for receiving a ball therein, said socket formed by a semispherical recess in the upper portion of the body member and a complementary semispherical recess disposed in a lower portion hingedly connected to the body member. Said lower hinged portion is provided with a bolt member that extends therethrough and through the body member with a swivel member mounted on said bolt member and having a disc member adapted to slide along an inclined plane disposed on said body member so said semispherical recesses form a spherical socket for a socket member when the trailer hitch is secured to a towing vehicle. Lug means are provided on the body member and a bar means for securing the swivel member to the body member and biasing means with a pin member are disposed in a housing on the body member to bear against said lower portion member to prevent the lower portion member from inadvertently separating from said body member.

INVENTOR.
ELMER M. FARR,
BY
Berman, Davidson & Berman
ATTORNEYS

INVENTOR.
ELMER M. FARR,
BY
Berman, Davidson & Berman
ATTORNEYS.

TRAILER HITCH

The present invention relates in general to an improved hitch for a trailer by which the latter is quickly attached and detached to an automobile and the like.

It is an object of the present invention to provide a trailer hitch that is almost completely self-latching and which hitch can be used in either a vertical or horizontal position.

It is another object of the present invention to provide a trailer hitch for an automobile and the like that can be readily adjusted if the ball that is generally connected to the bumper of the vehicle becomes worn or the socket forming part of the trailer hitch becomes worn.

It is still a further object of the present invention to provide a rugged and yet simple and economically manufactured trailer hitch for a vehicle and the like.

It is still a further object of the present invention to provide a trailer hitch which will not place any stress on the other vehicle should the trailer or the vehicle towing it capsize. Yet another object of the present invention is to provide a trailer hitch that can be manufactured in any size in the trailer hauling field and which can be manufactured by a casting process, or by fabrication, as desired. Various other objects and advantages of the present invention will be readily apparent from the following detailed description when considered in connection with the accompanying drawings forming a part thereof, and in which FIG. 1 is a top plan view of the trailer hitch embodied in the present invention showing it connected to a towing vehicle.

Figure 1:
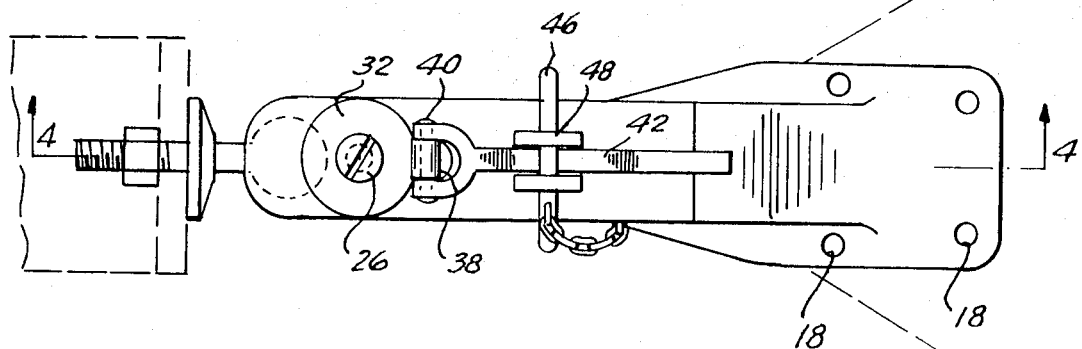

Referring to the drawings, the reference numeral 10 generally designates the trailer hitch of the present invention which is provided with a body member 12 which comprises a substantially elongated configuration having a relatively rectangular solid section or portion 14 adjacent its front end which tapers into a flat or horizontal plate 16 adjacent its rear having four holes therein indicated at 18 for securing it to the drawbar of a trailer.

Figure 2:
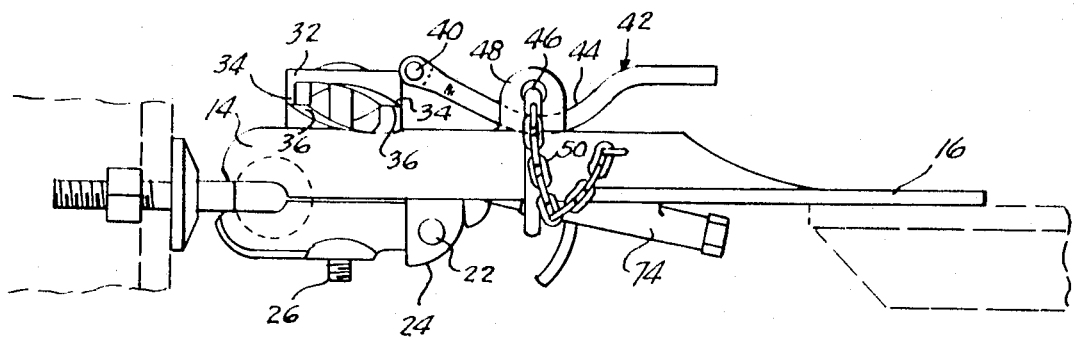
FIG. 2 is a side elevation of the trailer hitch illustrated in FIG. 1.
Figure 3:
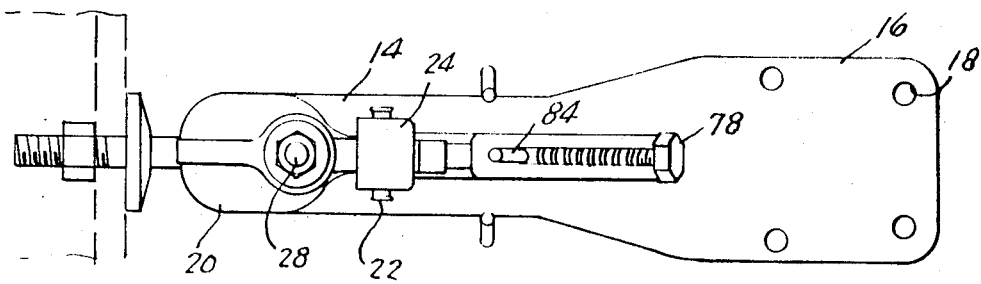
FIG. 3 is a bottom plan view of the trailer hitch illustrated in FIG. 1.

The front end of the portion 14 is provided with a lower portion 20 hingedly connected thereto by the pin 22 which extends through the rear of the portion 20 and has its opposite ends secured to a semicircular cowl or casing 24 extending below the upper portion 14. A bolt member 26 is threaded through the portion 14 and the lower portion 20 and is threaded on its lower end and is provided with two nuts 28 thereon which are disposed in a recess or countersink 30 in the portion 20. The bolt member is also threaded through a disc member 32 having two inclined surfaces or planes 34 on the lower side thereof, as best seen in FIG. 2, which are adapted to slide up or ride upon complementary inclined planes or surfaces 36 disposed on top of the portion 14. The disc 32 is provided with a hollow lug 38 through which is disposed a pin 40 hingedly connected to a handle member 42. The handle member 42 has a bend 44 therein which bend 44 is adapted to be disposed under a U-shaped bar 46 threaded through two upstanding eye members 48 secured to the top of the portion 14. The U-shaped bar 46 is connected to a chain 50 secured to the side of portion 14.

Figure 4:
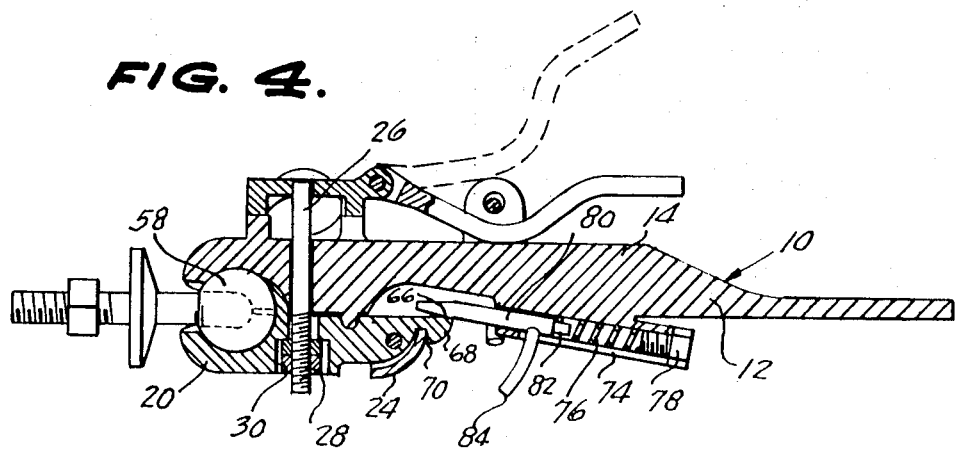
FIG. 4 is a section of the trailer hitch taken along the lines 4—4 of FIG. 1, with the trailer hitch clamped to the towing ball of the towing vehicle.
Figure 5:
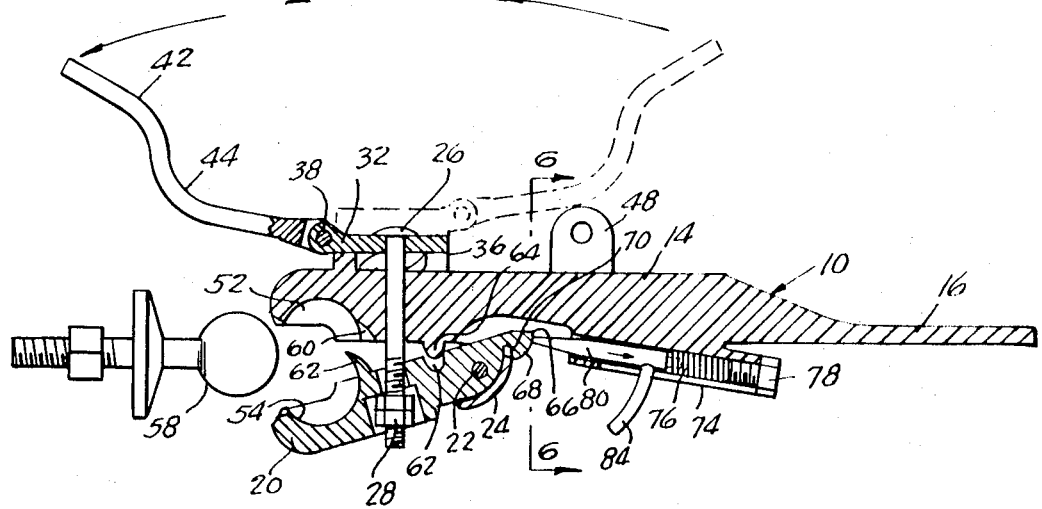
FIG. 5 is a view similar to FIG. 4, except it illustrates the trailer hitch in an opened position before it is clamped to the ball of the towing vehicle.
Figure 6:
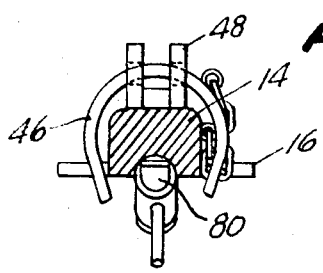
FIG. 6 is a section taken along the lines 6—6 of FIG. 5.

The front end of the portion 14 and the front end of the portion 20 are provided with semispherical recesses 52 and 54, respectively, which complement one another and form a spherical recess for receiving the ball 58 connected to the towing vehicle therein. Portion 14 is also provided with a recess 60 therein for receiving the tongue 62 extending upwardly from the portion 20. The portion 20 is provided with a concave recess 62' behind the bolt 26 for receiving a tongue 64 extending downwardly from the upper portion 14. Rearwardly of the tongue 64, the portion 14 is provided with a longitudinally extending recess 66 therein into which the rear end 68 of the portion 20 can pivot as best seen in FIG. 6. The portion 20 is provided with a slot or recess 70 therein just forward of the end 68 and the upper end of casing 24 extends into the recess 70 when the trailer hitch 10 is in a clamped or closed position, as best seen in FIG. 4.

A cylindrical housing 74 is provided on the bottom of the portion 14 and has a biasing spring 76 therein and is closed off by a threaded plug 78 at the rear thereof. The front end of the housing has a tapered pin 80 extending out thereof which is adapted to bear or ride over the rear end 68 of the portion 20, as best seen in FIG. 4, when the trailer hitch is securely clamped to the ball 58 of the towing vehicle. A slot 82 is provided in the bottom of the housing and the pin 80 has a handle 84 extending through the slot.

When it is desired to connect the trailer hitch device 10 to the ball 58 of an adapter which is connected to the bumper or other part of the towing vehicle, the disc 32 is turned or rotated so that it is at the lowest point on the inclined surface or planes 36 disposed on top of the portion 14. At this time the bolt member 26 is disposed in its lowermost position so that the lower portion 20 has its semispherical recess 54 and its tongue disposed away from the semispherical recess in the upper portion 14. At this time, the U-shaped bar 46 has been removed from the eyes 48 and the handle 84 has been utilized so that the pin 80 would not interfere with the release of the portion 20. When it is desired to secure the trailer hitch to the towing vehicle, either the towing vehicle is backed toward the trailer hitch or the trailer hitch is moved forwardly until the ball 58 is disposed in the recess 52 of the upper portion 14. Thereafter, the handle 42 is turned or rotated so that the disc 32 will ride up the inclined surfaces or planes 36 and the handle is turned to the position illustrated in FIG. 4, or to the position wherein the handle is disposed toward the rear of the trailer hitch device 10. The turning of the handle 42 will cause the bolt member 26 to ride or move to its uppermost position as best seen in FIG. 4, at which time, the recess 54 will be encompassing the lower portion of the ball 58 and the tongue 62 will move into the corresponding recess 60 and the portion 20 will be disposed in a horizontal position. Thereafter the handle 42 is disposed between the eyes 48 and the U-shaped bar 46 is threaded through the eyes so as to maintain the handle 42 in a secured or locked position. At this time the pin 80 will be forced into a locking position on top of the rear end 68 of the portion 20 so that the trailer hitch is in a completely secured position. Should anything happen to the bolt 26, the ball 58 would still remain clamped in the spherical recess because the pin 80 bearing over the rear end 68 of the portion 20 would maintain the trailer hitch in a locked or clamped position.

Thus, from the foregoing description, it is apparent that the present invention provides a trailer hitch that can be used in a vertical position and can be used on a gooseneck trailer, and in which the hitch and the ball will allow for turning in either direction and will have free movement up and down when the trailer is being pulled over rough terrain or surfaces.

From the foregoing description it will be apparent that various changes may be made in the form, location and relative arrangement of the several parts without departing from the essential characteristics of the invention, and it is to be understood that this invention is not to be limited except by the scope of the appended claims.

I Claim:

1. A trailer hitch comprising a generally elongated member with a front upper portion and a front lower portion forming together a spherical recess for receiving therein a ball member attached to a towing vehicle, said lower portion being hingedly connected at its rear end to said upper portion, bolt means extending through said upper and lower portions forwardly of said rear end and rearward of said spherical recess for clamping said portions together to provide said spherical recess, an inclined plane surface on said upper portion, a disc mounted on said bolt member adapted to ride up said plane surface to pull said bolt member upwardly to clamp said lower portion against said upper portion to secure said ball member in said spherical recess, said upper portion being provided with an enlarged recess adjacent the rear of said lower portion, and bin means on the bottom of said upper portion adapted to extend into said enlarged recess and bear against the rear of said lower portion to prevent it from coming unclamped.

2. The device of claim 1 wherein a handle is hingedly connected to said disc to turn it and spaced lugs are provided on said upper portion and said handle is disposed to fit between said lugs and bar means secure said handle between said lugs.

3. The device of claim 1 wherein said pin means comprises a pin enclosed in a housing and spring means therein normally urging said pin into contact with said lower portion.

4. The device of claim 3 wherein said disc has inclined plane surfaces on the bottom thereof adapted to ride on said upper portion inclined plane surface.

5. The device of claim 4 wherein said lower portion is provided with a tongue adjacent its spherical recess which extends into a complementary recess in said upper portion.

6. The device of claim 5 wherein a tongue extends out of the bottom of said upper portion and a complementary recess therefor is provided in said lower portion rearwardly of said bolt member.

7. the device of claim 6 wherein said upper portion has a casing with a transverse pin therein extending below the upper portion and said lower portion is hingedly connected to said pin.

8. The device of claim 7 wherein said casing is arcuate and its upper end is adapted to extend into a notch on the bottom of said lower portion.

* * * * *